US011865691B2

(12) United States Patent
Hamroff et al.

(10) Patent No.: US 11,865,691 B2
(45) Date of Patent: Jan. 9, 2024

(54) POWER TOOL WITH CHUCK KEY HOLDER

(71) Applicant: BLACK & DECKER INC., New Britain, CT (US)

(72) Inventors: Andrew David Hamroff, Baltimore, MD (US); Joseph Patrick Kelleher, Parkville, MD (US); Shihuai Wang, Suzhou (CN); GaoLi Dou, Suzhou (CN)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 17/457,512

(22) Filed: Dec. 3, 2021

(65) Prior Publication Data

US 2022/0184794 A1 Jun. 16, 2022

Related U.S. Application Data

(60) Provisional application No. 63/123,708, filed on Dec. 10, 2020.

(51) Int. Cl.
*B25F 5/02* (2006.01)
*B23B 45/00* (2006.01)

(52) U.S. Cl.
CPC ............ *B25F 5/029* (2013.01); *B23B 45/006* (2013.01)

(58) Field of Classification Search
CPC ............. Y10T 279/3443; Y10T 408/96; B23B 45/006; B25B 33/005; B25F 5/029
USPC ...................................... 408/241 R; 279/149
See application file for complete search history.

(56) References Cited

U.S. PATENT DOCUMENTS

| 1,515,029 | A | | 11/1924 | Goss |
| 1,647,396 | A | | 11/1927 | Galloway |
| 1,803,307 | A | | 4/1931 | Wodack |
| 1,821,436 | A | * | 9/1931 | Holloway ............. B23B 45/006 |
| | | | | D8/69 |
| 3,141,359 | A | | 7/1964 | Bennett et al. |

(Continued)

FOREIGN PATENT DOCUMENTS

| FR | 2302164 A1 | 9/1976 |
| GB | 462975 A | 3/1937 |
| GB | 1432409 A | 4/1976 |

OTHER PUBLICATIONS

Extended European Search Report, dated May 12, 2022, Application No. 21213351.6.

(Continued)

*Primary Examiner* — Andrew M Tecco
(74) *Attorney, Agent, or Firm* — Stephen R. Valancius

(57) ABSTRACT

A power tool includes a housing, a motor disposed in the housing, an output spindle extending outward from the housing and configured to be rotationally driven by the motor, a keyed chuck coupled to the output spindle for rotation with the output spindle, and a chuck key holder configured to releasably retain a chuck key with a first shaft with a key disposed thereon for operating the chuck, and a second shaft coupled to the first end portion of the first shaft generally perpendicular to the first shaft, the second shaft including a lever portion. The chuck key holder includes a first recess configured to receive the first shaft and a second recess with a sheath configured to receive the second shaft with the lever portion exposed from the sheath.

17 Claims, 15 Drawing Sheets

(56) References Cited

U.S. PATENT DOCUMENTS

| | | | |
|---|---|---|---|
| 3,348,432 A | 10/1967 | Kieffer, III | |
| 3,785,443 A | 1/1974 | Armbruster | |
| 4,032,160 A * | 6/1977 | Karasa | B23B 45/006 403/349 |
| 4,730,134 A | 3/1988 | Sistare | |
| D295,141 S | 4/1988 | Hoshino et al. | |
| D295,364 S | 4/1988 | Hoshino et al. | |
| 4,747,733 A * | 5/1988 | Akazawa | B23B 45/006 408/241 R |
| D296,413 S | 6/1988 | Hoshino et al. | |
| 4,790,696 A | 12/1988 | Williams | |
| D299,808 S | 2/1989 | Hoshino et al. | |
| D300,718 S | 4/1989 | Fushiya et al. | |
| D301,114 S | 5/1989 | Fushiya et al. | |
| D303,347 S | 9/1989 | Somers | |
| 4,954,026 A * | 9/1990 | Zurwelle | B23B 45/006 206/373 |
| 4,973,205 A * | 11/1990 | Spaulding | B25F 5/021 408/16 |
| 4,986,554 A | 1/1991 | Rathbun | |
| D314,498 S | 2/1991 | Hoshino et al. | |
| 5,025,903 A * | 6/1991 | Elligson | B25F 5/001 81/475 |
| 5,056,661 A * | 10/1991 | Balzano | B25F 5/029 D3/304 |
| D333,960 S | 3/1993 | Somers | |
| 5,230,261 A * | 7/1993 | Akazawa | B25F 5/029 81/439 |
| D339,727 S | 9/1993 | Kikuchi | |
| D343,567 S | 1/1994 | Okumura | |
| D350,267 S | 9/1994 | Tozawa | |
| 5,653,294 A | 8/1997 | Thurler | |
| D384,262 S | 9/1997 | Hayakawa et al. | |
| 5,873,282 A | 2/1999 | Dibbern, Jr. et al. | |
| D409,467 S | 5/1999 | Chung | |
| 5,934,143 A | 8/1999 | Dibbern, Jr. et al. | |
| D447,036 S | 8/2001 | Netzler | |
| 6,305,481 B1 * | 10/2001 | Yamazaki | F16D 7/08 192/56.62 |
| D469,674 S | 2/2003 | Chung | |
| D472,781 S | 4/2003 | Netzler | |
| 6,702,530 B2 * | 3/2004 | Bennage | B25F 5/029 408/241 R |
| D508,837 S | 8/2005 | Andriolo | |
| D515,375 S | 2/2006 | Tsang et al. | |
| 7,004,357 B2 | 2/2006 | Shew | |
| D517,885 S | 3/2006 | Corcoran | |
| D525,846 S | 8/2006 | Corcoran | |
| D530,581 S | 10/2006 | Ino et al. | |
| D548,557 S | 8/2007 | Waldron | |
| D577,272 S | 9/2008 | Murray et al. | |
| D578,854 S | 10/2008 | Lopano | |
| D579,743 S | 11/2008 | Lopano | |
| 7,523,843 B2 | 4/2009 | Shew et al. | |
| 7,591,616 B1 * | 9/2009 | Kerner | B25F 5/029 408/124 |
| D607,704 S | 1/2010 | Murray | |
| D642,036 S | 7/2011 | Miller et al. | |
| D642,037 S | 7/2011 | Miller et al. | |
| D642,038 S | 7/2011 | Murray | |
| 7,997,456 B2 | 8/2011 | Shew et al. | |
| 8,434,564 B2 | 5/2013 | Tomayko et al. | |
| 8,460,153 B2 | 6/2013 | Rudolph et al. | |
| D708,496 S | 7/2014 | Zhou | |
| D730,136 S | 5/2015 | Lichtensteiger et al. | |
| D805,364 S | 12/2017 | Gu | |
| 10,183,394 B1 * | 1/2019 | Dagnan, III | B65D 25/10 |
| D866,280 S | 11/2019 | Nakamura et al. | |
| 2003/0165366 A1 * | 9/2003 | Bennage | B23B 45/006 81/177.4 |
| 2006/0022002 A1 * | 2/2006 | Marks | A45F 5/00 224/268 |
| 2013/0161040 A1 | 6/2013 | Tomayko et al. | |
| 2018/0272298 A1 | 9/2018 | Carlson et al. | |

OTHER PUBLICATIONS

Extended European Search Report, EP Application No. 21213351.6, dated May 12, 2022, 9 pages, EPO.

* cited by examiner

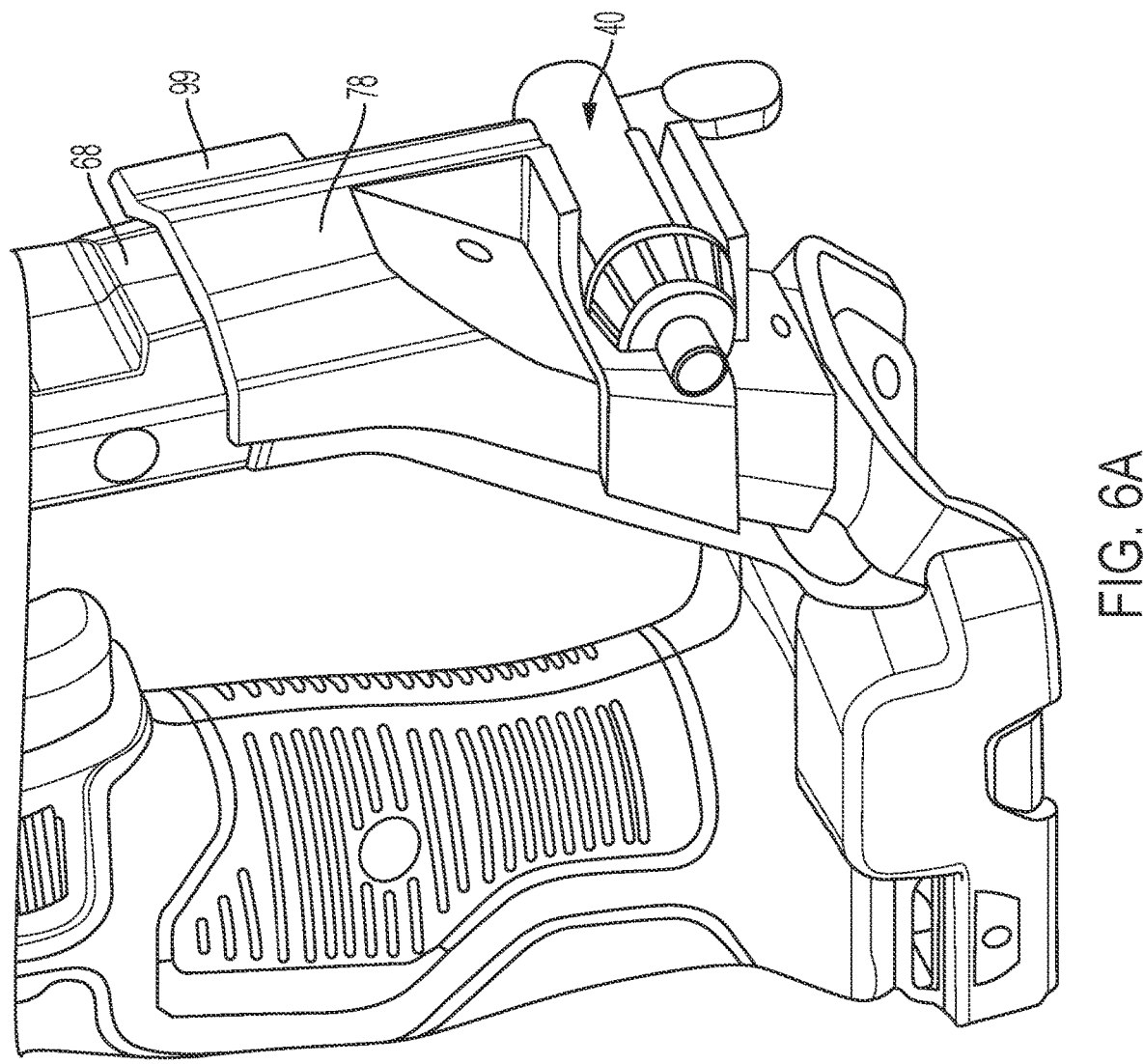

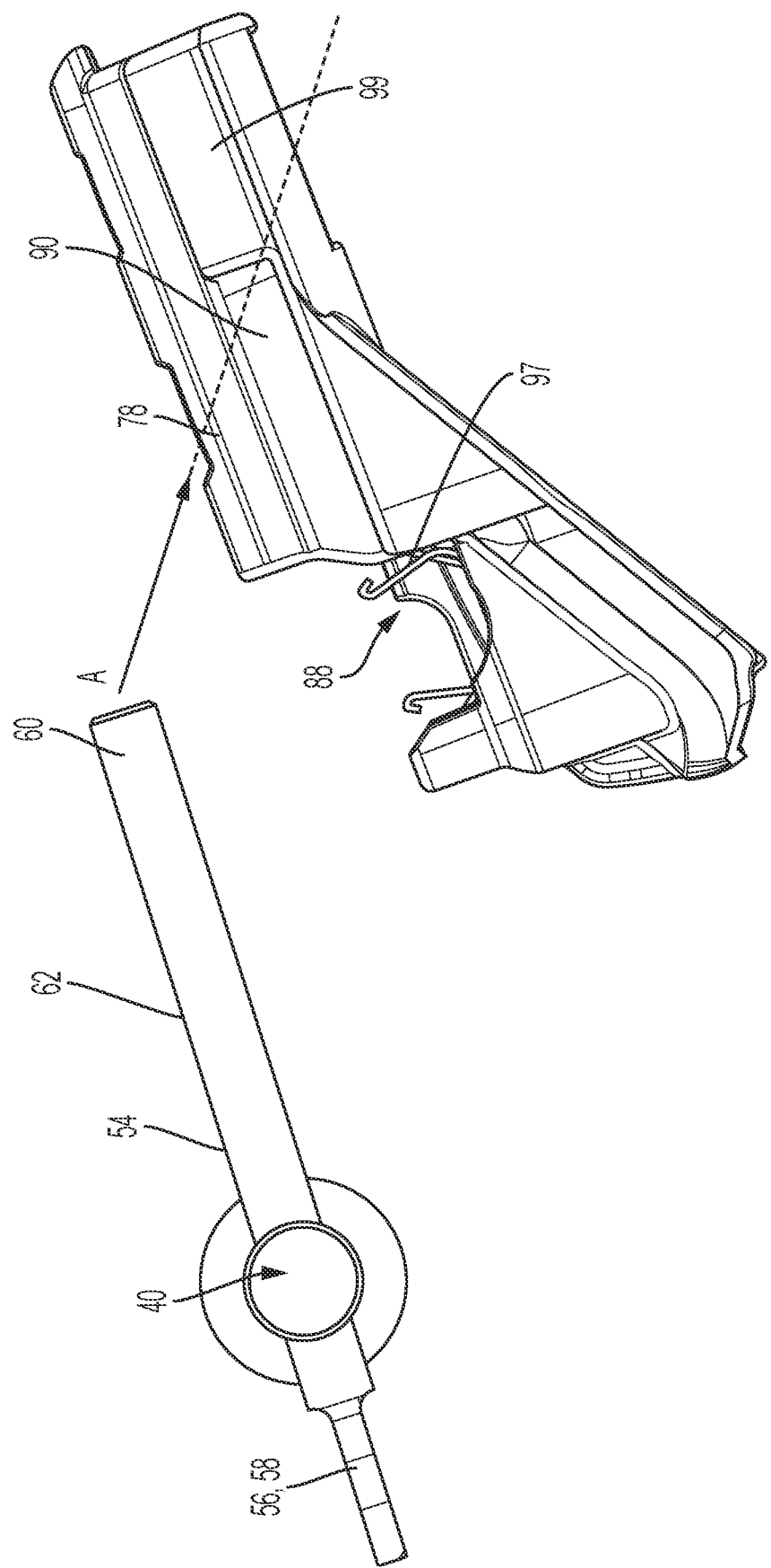

POWER TOOL WITH CHUCK KEY HOLDER

RELATED APPLICATION

This application claims priority, under 35 U.S.C. § 119(e) to U.S. Provisional Application No. 63/123,708, filed, Dec. 10, 2021, titled "Power Tool with Chuck Key Holder," which is incorporated by reference.

TECHNICAL FIELD

This application relates to power tool with a chuck key holder.

BACKGROUND

Power tools such as drills may have a chuck for holding a tool bit, such as a drill bit or a screwdriving bit, during operation of the power tool. Some chucks are keyed chucks which require a separate chuck key for tightening and loosening the chuck around the tool bit. Often, the chuck keys can be misplaced when not in use.

SUMMARY

In an aspect, a power tool includes a housing, a motor disposed in the housing, an output spindle extending outward from the housing and configured to be rotationally driven by the motor, and a keyed chuck coupled to the output spindle for rotation with the output spindle. Coupled to the housing is a chuck key holder configured to releasable retain a T-shaped chuck key that includes a first shaft having a first end and a second end with a key disposed thereon, and a second shaft coupled to the first end of the first shaft generally perpendicular to the first shaft, the second shaft including a shorter third end with a lever portion and a longer fourth end. The chuck key holder may include a first recess configured to receive the first shaft and a second recess configured to receive the second shaft. The second recess may include a sheath configured to receive the longer fourth end of the shaft with the lever portion exposed from the sheath.

Implementations of this aspect may include one or more of the following features. The chuck key holder may be removably coupled to the housing. The housing may include a handle portion, where the chuck key holder is removably coupled to the handle portion. The handle portion may have a handgrip configured to be grasped by a hand of a user and a guard disposed in front of the handgrip with a space between the handgrip and the guard configured to receive fingers of the user when grasping the handgrip. The chuck key holder may be removably coupled to the guard. The chuck key holder may include a body having an at least partially U-shaped cross section and configured to wrap at least partially around the guard. The body may be removably coupled to the guard by at least one threaded fastener. The handgrip and the guard may form a D-shape. A battery receptacle may be coupled to a base of the handgrip opposite the motor housing for powering the motor.

The first recess may be contoured to correspond to a contour of the first shaft. A spring clip may be received in the first recess for receiving the first shaft. The sheath may be configured to enable angular rotation of the chuck key about the first shaft axis between A release position where the chuck key can be removed from the holder and a retained position where the chuck key is retained in the holder. The second shaft can be removed by grasping the lever portion and pivoting the chuck key about the first shaft. The first recess may be configured to releasably retain a tool bit when the chuck key is removed from the chuck key holder.

The holder may include a lock removable receivable over the chuck key when it is received in the holder. The lock may include a sliding lock body configured to slide over the chuck key when retained in the holder. The sliding lock body may be received in a slot in the holder and biased outward from the slot by a spring. The sliding lock body may have a T-shaped cross-section with a base that is slidable over the first recess when the sliding lock body extends from the slot to help retain the chuck key in the first recess. The sliding lock body may have a tapered end face that can be engaged by the first shaft of the chuck key when inserting the chuck key into the first recess, causing the sliding lock body to retract into the recess against the force of the spring. The tapered end face may be engaged by a user to push the sliding lock body into the slot when removing the chuck key from the holder.

In another aspect, a power tool includes a housing, a motor disposed in the housing, an output spindle extending outward from the housing and configured to be rotationally driven by the motor, and a keyed chuck coupled to the output spindle for rotation with the output spindle. Coupled to the housing is a chuck key holder with a body and a recess configured to releasable retain a chuck key. A lock is coupled to the body and configured to slide over the chuck key when retained in the first to retain the chuck key in the recess.

Implementations of this aspect may include one or more of the following features. The chuck key holder may be removably coupled to the housing. The housing may include a handle portion, where the chuck key holder is removably coupled to the handle portion. The handle portion may have a handgrip configured to be grasped by a hand of a user and a guard disposed in front of the handgrip with a space between the handgrip and the guard configured to receive fingers of the user when grasping the handgrip. The chuck key holder may be removably coupled to the guard. The chuck key holder may include a body having an at least partially U-shaped cross section and configured to wrap at least partially around the guard. The body may be removably coupled to the guard by at least one threaded fastener. The handgrip and the guard may form a D-shape. A battery receptacle may be coupled to a base of the handgrip opposite the motor housing for powering the motor.

The recess may be configured to receive a T-shaped chuck key. The recess may include a first recess configured to receive a first shaft of the chuck key having a first end and a second end with a key disposed thereon. The recess may further include a second recess configured to receive a second shaft of the chuck key that is coupled to the first shaft of the chuck key generally perpendicular to the first shaft. The second recess may include a sheath configured to receive a longer fourth end of the second shaft of the chuck key with a shorter second end with a lever portion exposed from the sheath. The first recess may be contoured to correspond to a contour of the first shaft. The first recess may be configured to alternatively receive a tool bit when the chuck key is removed from the chuck key holder. A spring clip may be received in the first recess for receiving the first shaft or a tool bit.

The lock may include a sliding lock body received in a slot in the holder and biased outward from the slot by a spring. The sliding lock body may have a T-shaped cross-section with a base that is slidable over the first recess when the sliding lock body extends from the slot to help retain the chuck key in the first recess. The sliding lock body may have a tapered end face that can be engaged by the first shaft of the chuck key when inserting the chuck key into the first recess, causing the sliding lock body to retract into the recess against the force of the spring. The tapered end face may be engaged by a user to push the sliding lock body into the slot when removing the chuck key from the holder.

Advantages may include one or more of the following. The chuck key holder may include a sheath for retaining a longer end of the chuck key second shaft to better retain the chuck key in the holder. The chuck key holder may include a sliding The chuck key may be retained in the chuck key holder by the first shaft and the second shaft. The first chuck key holder can alternatively releasably retain a tool bit when the chuck key is removed. These and other advantages and features will be apparent from the description and the drawings.

BRIEF DESCRIPTION OF THE DRAWINGS

FIGS. 6A-6B are close up perspective views of the handle and chuck key holder and chuck key of FIG. 1.

FIGS. 7A-7C are side views of the chuck key holder and chuck key of FIG. 1 in operation.

DETAILED DESCRIPTION

Figure 1:
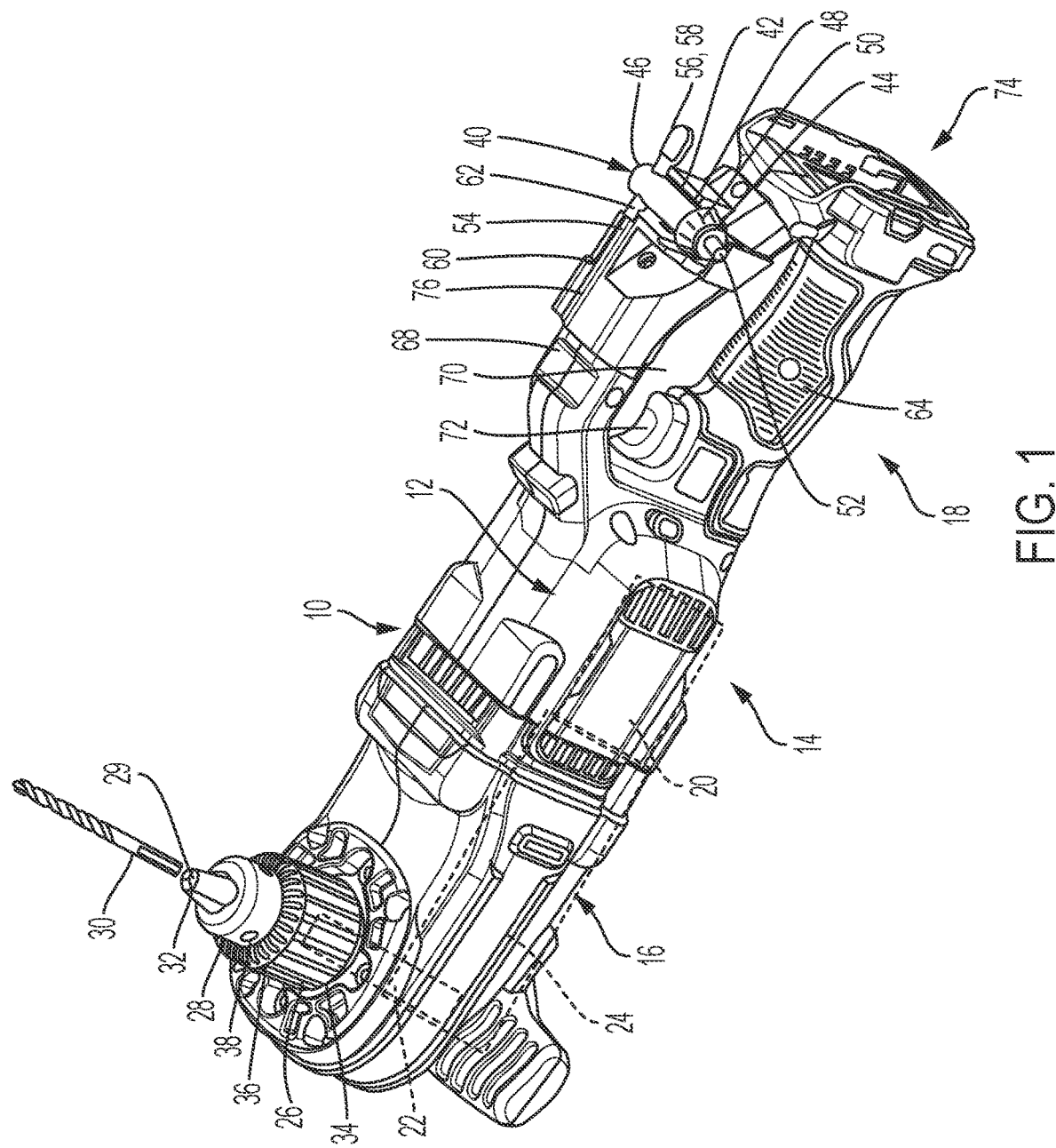
FIG. 1 is a perspective view of a power tool with a chuck key holder.
Figure 2:
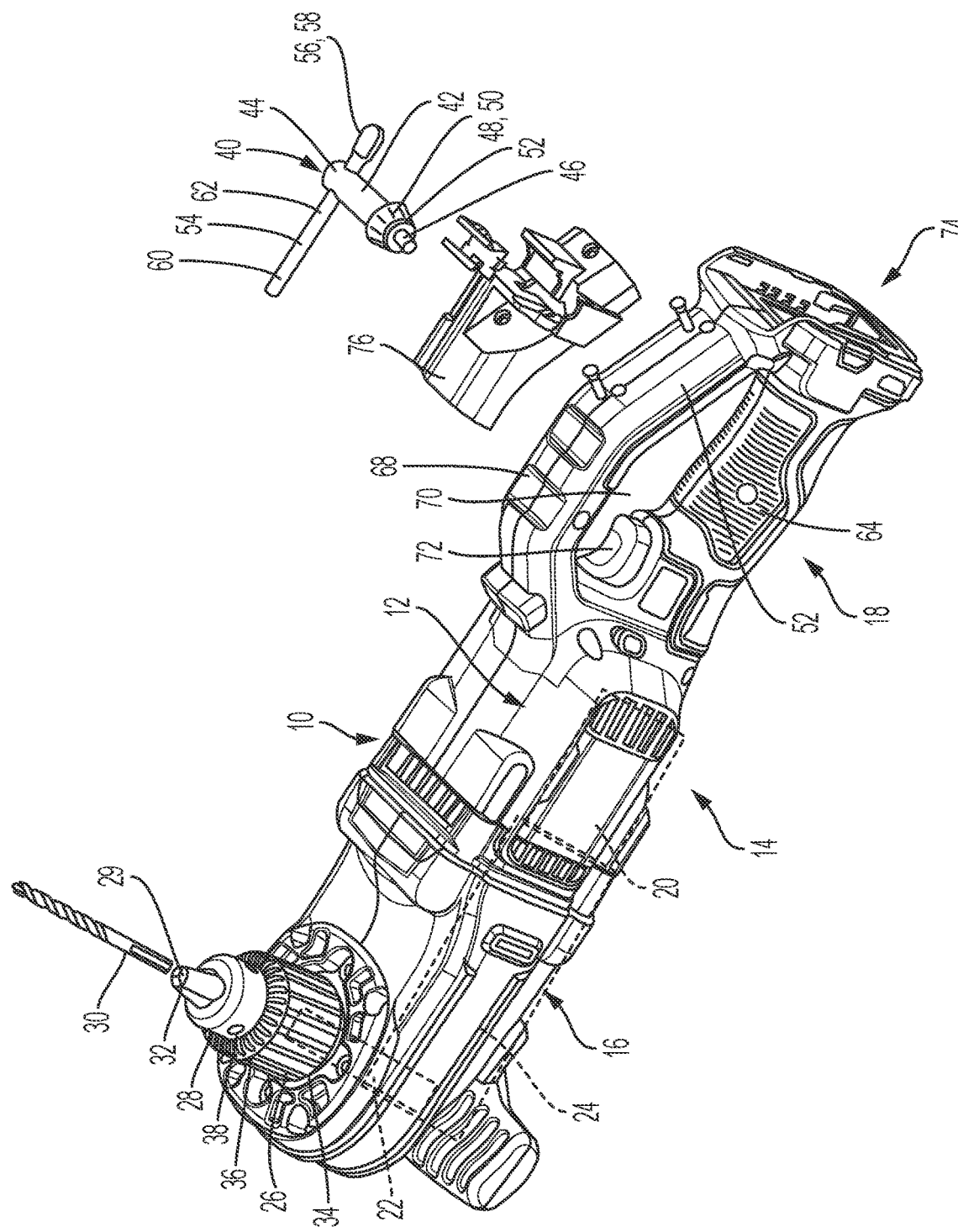
FIG. 2 is an exploded perspective view of power tool with chuck key holder of FIG. 1.
Figure 3:
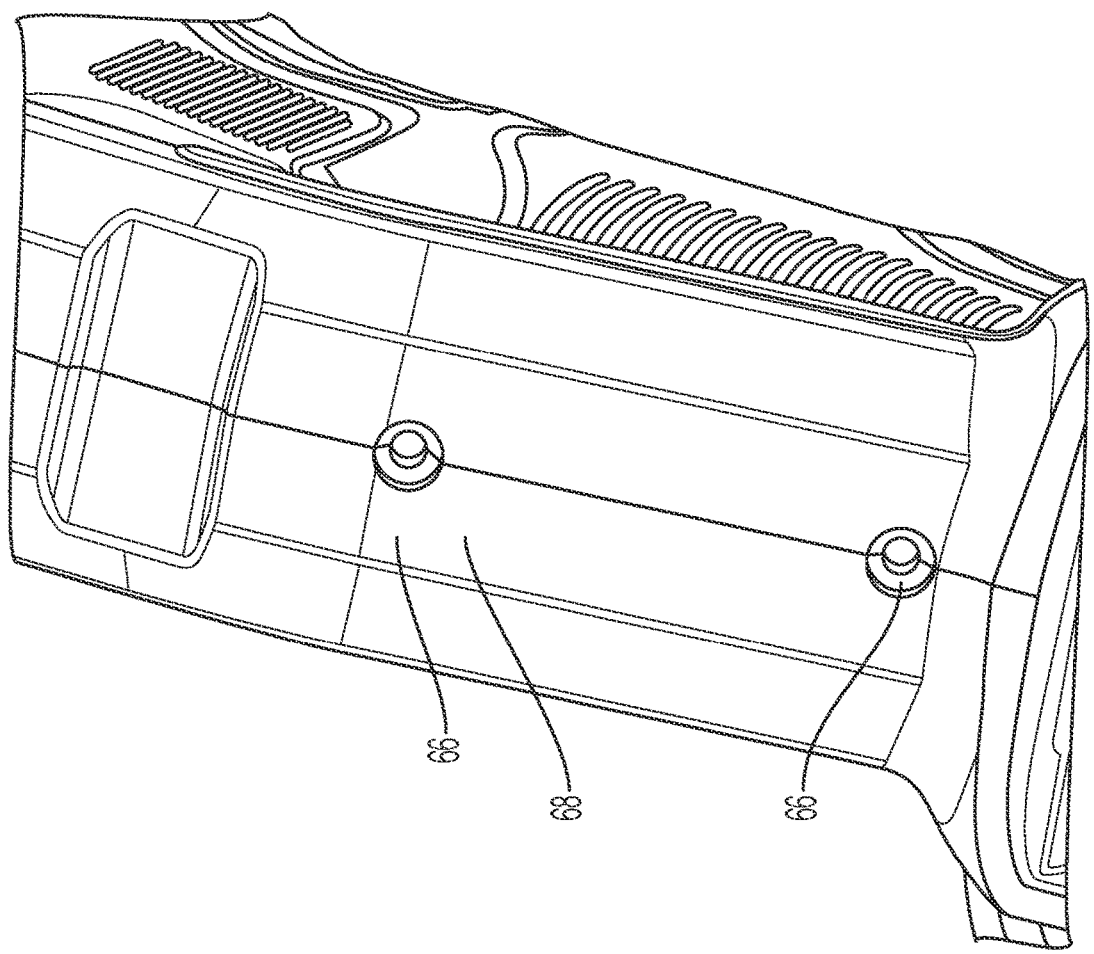
FIG. 3 is a perspective view of the handle of the power tool of FIG. 1.
Figure 4:
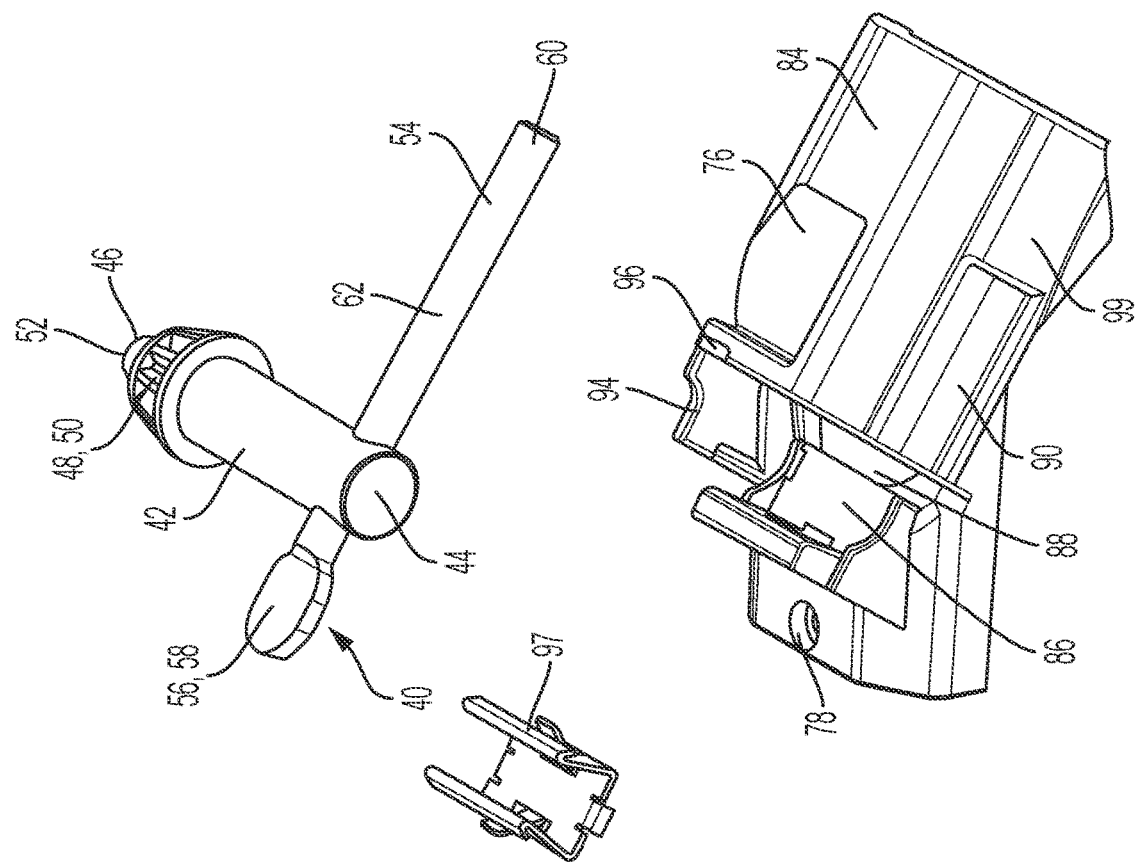
FIG. 4 is an exploded view of the chuck key holder of FIG. 1.

Referring to FIGS. 1 and 2, a power tool 10 includes a housing 12 having a motor housing portion 14, a gear housing portion 16, and a handle portion 18. A motor 20 is disposed in the motor housing portion 14 and is coupled to an output spindle 22 by a transmission 24 received in the gear housing portion 16. The output spindle 22 extends outward from the gear housing portion 16 of the housing 12 and is configured to be rotationally driven by the motor 20. A chuck 26 is coupled to the output spindle 22 for rotation with the output spindle 22. The chuck has a body 28 coupled to the output spindle 22, a central opening 29 configured to receive a tool bit 30 (such as a drill bit or a screwdriver bit), a plurality of jaws 32 received in the body and displaceable in the body 32 to releasably engage the tool bit, and a tightening ring 34 coupled to the body and configured to be rotated to cause the jaws to tighten and loosen around the tool bit.

The tightening ring 34 has a plurality of teeth 36 and the body has an opening 38 configured to receive a chuck key 40 therein for rotating the tightening ring for tightening and loosening the jaws. The chuck key 40 is T-shaped and includes a first shaft 42 having a first end 44 and a second end 46. The second end 46 as a key portion 48 with teeth 50 configured to engage the teeth 36 on the tightening ring and a nose 52 configured to be received in the opening 38 in the chuck body. The chuck key 40 also has a second shaft 54 coupled to the first end of the first shaft generally perpendicular to the first shaft. The second shaft 54 has a shorter third end 56 with a lever 58 (e.g., in the form of a flattened finger grip), a longer fourth end 60, and an intermediate portion 62 between the third end 56 and the fourth end 60 where the second shaft 54 is coupled to the first shaft 42. In operation, the nose of the chuck key is inserted into the opening in the body so that the teeth of the chuck key engage the teeth on the tightening ring, and the second shaft is rotated to cause the first shaft to rotate about its longitudinal axis. This causes the tightening ring to rotate, in turn causing the jaws to tighten or loosen about a tool bit received in the chuck. The structure and operation of the chuck and key may be similar to the chuck and key disclosed in U.S. Pat. No. 4,214,765, which is incorporated by reference.

The handle portion 18 has a handgrip 64 configured to be grasped by a hand of a user and a guard 68 disposed in front of the handgrip with a space 70 between the handgrip and the guard configured to receive fingers of the user when grasping the handgrip. The handgrip 64 and guard 68 are connected at their top and bottom to form a D-shaped configuration. A trigger 72 is coupled to the handgrip for actuating and controlling power delivery to the motor. A battery receptacle 74 is coupled to a distal end of the handle portion 18 and is configured to receive a battery (not shown) to power the motor. The front of the guard 68 includes a plurality of openings 66 configured to receive threaded fasteners Referring also to FIGS. 3-6B, in one implementation, a chuck key holder 76 is removably coupled to the guard 68 of the handle portion 18 of the housing 12. The chuck key holder 76 has a body 84 having an at least partially U-shaped cross section and configured to wrap at least partially around the guard. The front of the guard 68 includes at least one (e.g. two) openings 66 and the chuck key holder 76 includes at least one (e.g., two) openings 78 aligned with the openings 66. The openings 66, 78 are configured to receive threaded fasteners 82 for removably coupling the chuck key holder 76 to the guard 68 of the housing.

Figure 5A:
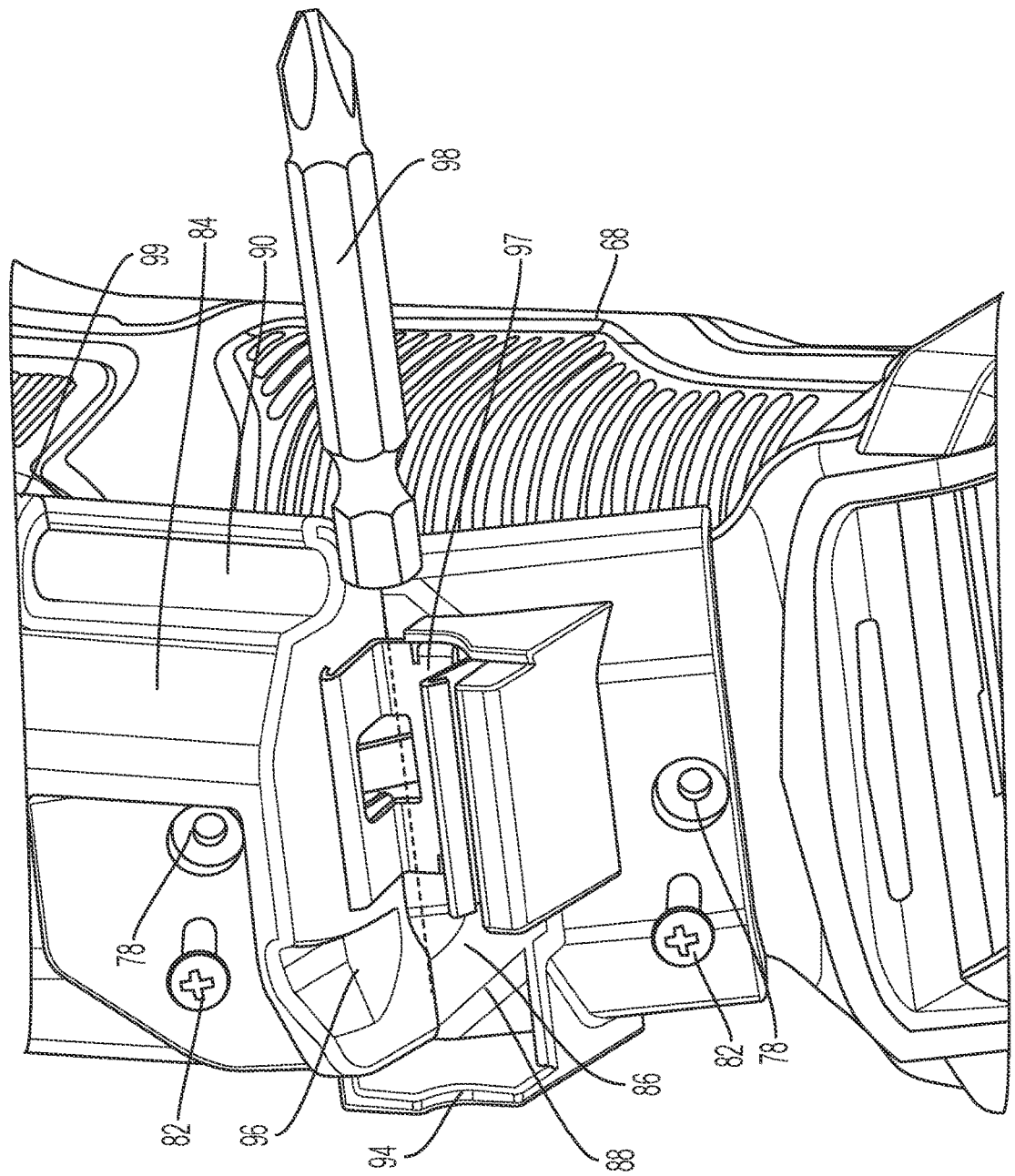
FIG. 5A is a close up perspective view of the chuck key holder and tool bit of FIG. 1.
Figure 5B:
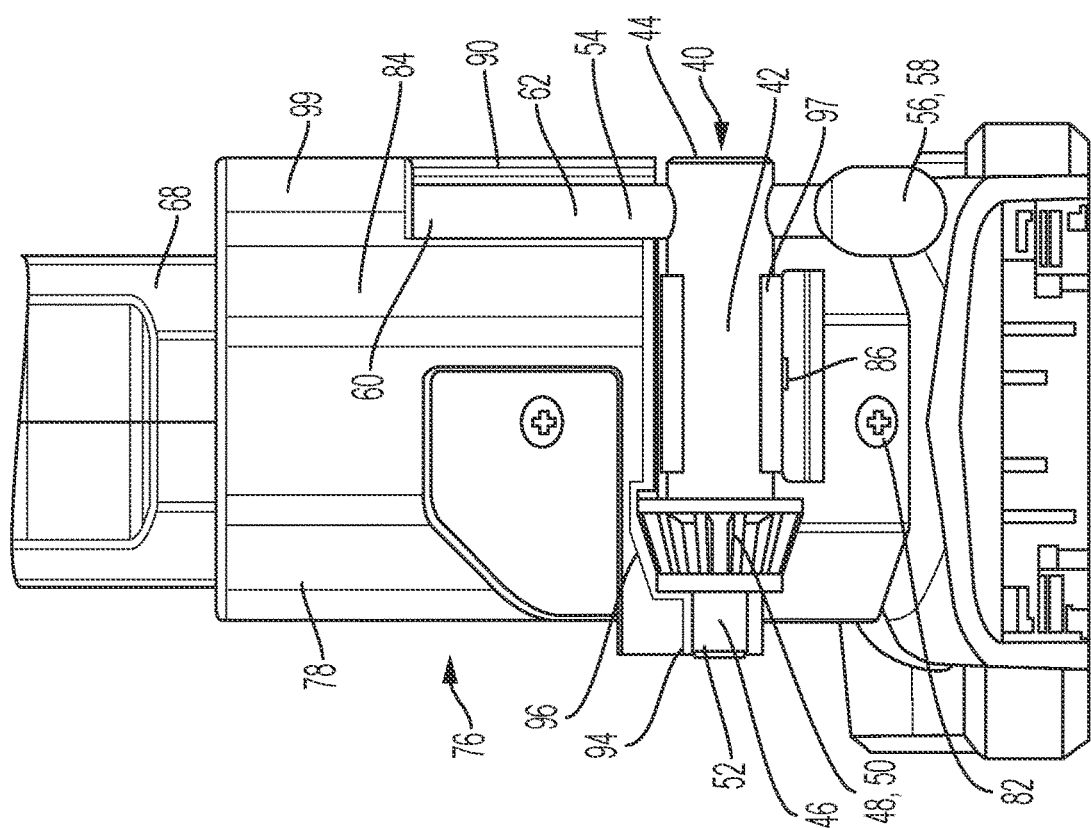
FIG. 5B is a close up front view of the handle and chuck key holder and chuck key of FIG. 1.
Figure 6B:
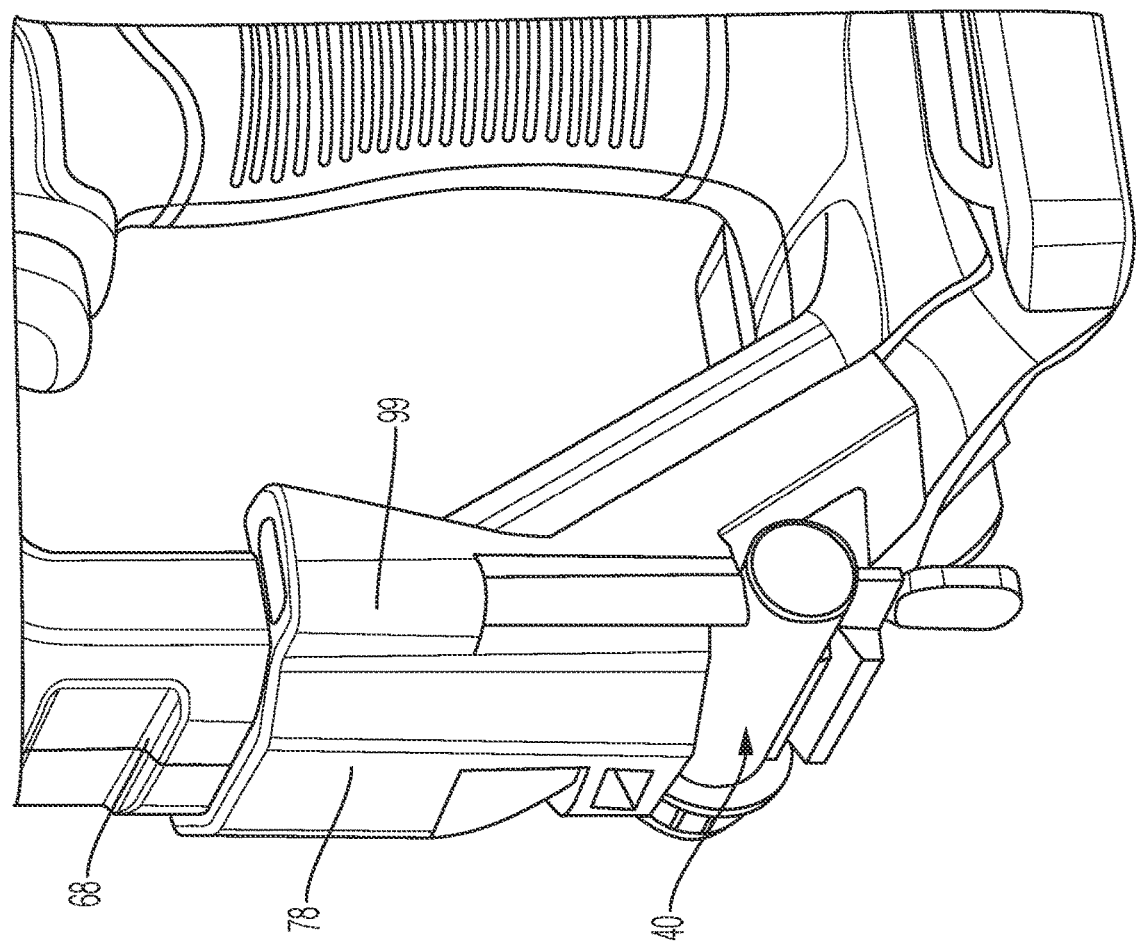

The chuck key holder 76 has a recess 86 configured to releasably retain the chuck key 40 therein. The recess 86 includes a first recess 88 configured to receive the first shaft 42 of the chuck key 40 and a second recess 90 configured to receive the second shaft 54 of the chuck key 40. The first recess 88 is contoured to correspond to a contour of the first shaft 42. For example, the first recess 88 includes a depression 96 configured to receive the key portion 48 and a ledge 94 configured to receive the nose 52. A spring clip 97 is received in the first recess for receiving the first shaft. As shown in FIG. 5, the first recess 88 and spring clip 97 alternatively may releasably retain a tool bit 98, such as a screwdriver bit, when the chuck key is removed from the chuck key holder. The second recess 90 extends into a sheath 99 that is configured to receive the fourth end 60 of the second shaft 54 with its intermediate portion 62 and third end 56 extending out of the second recess 90 and out of the sheath 99. The sheath 99 is configured to better retain the longer fourth end of the second shaft of the chuck key when the chuck key is received in the holder.

Figure 7B:
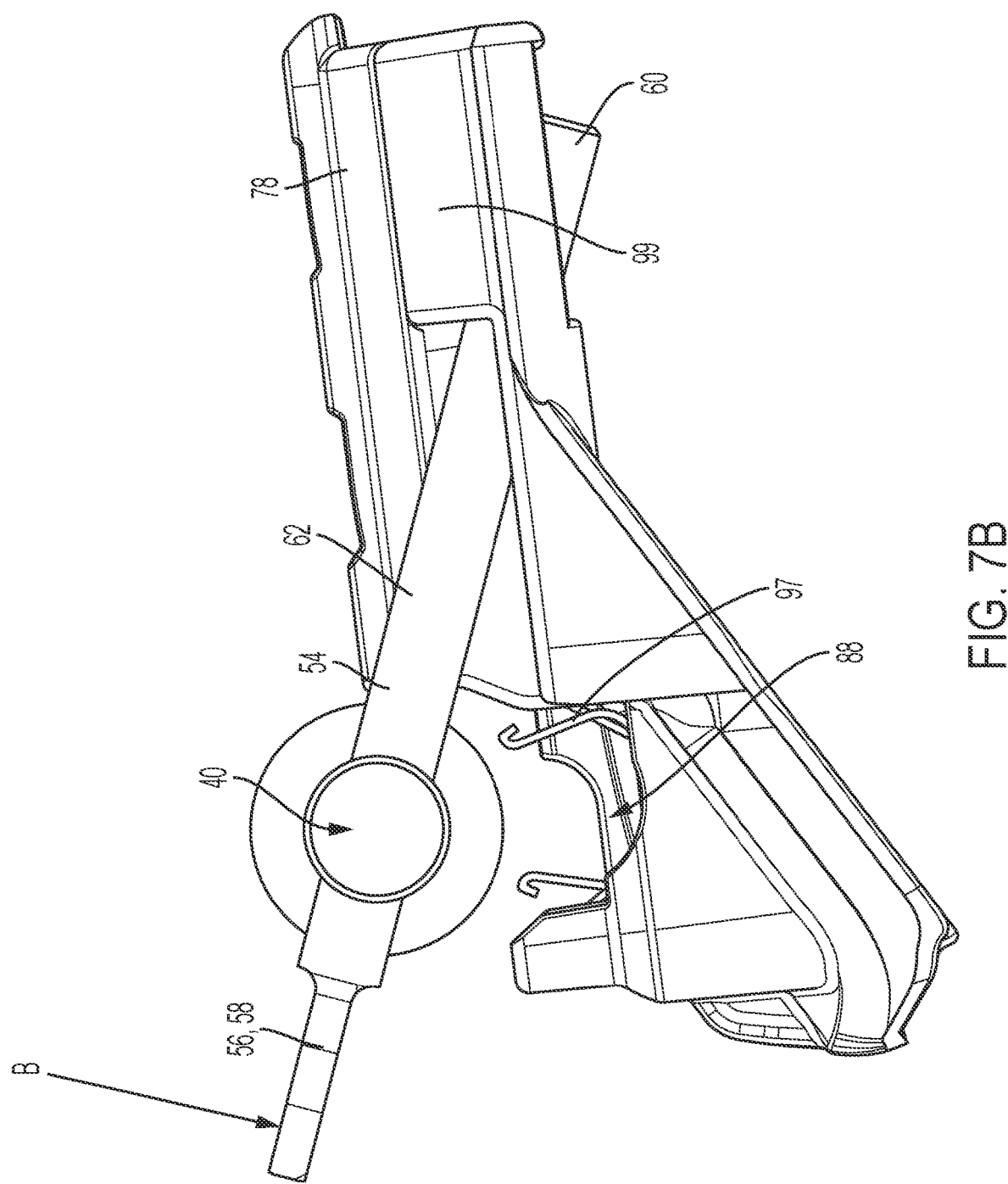
Figure 7C:
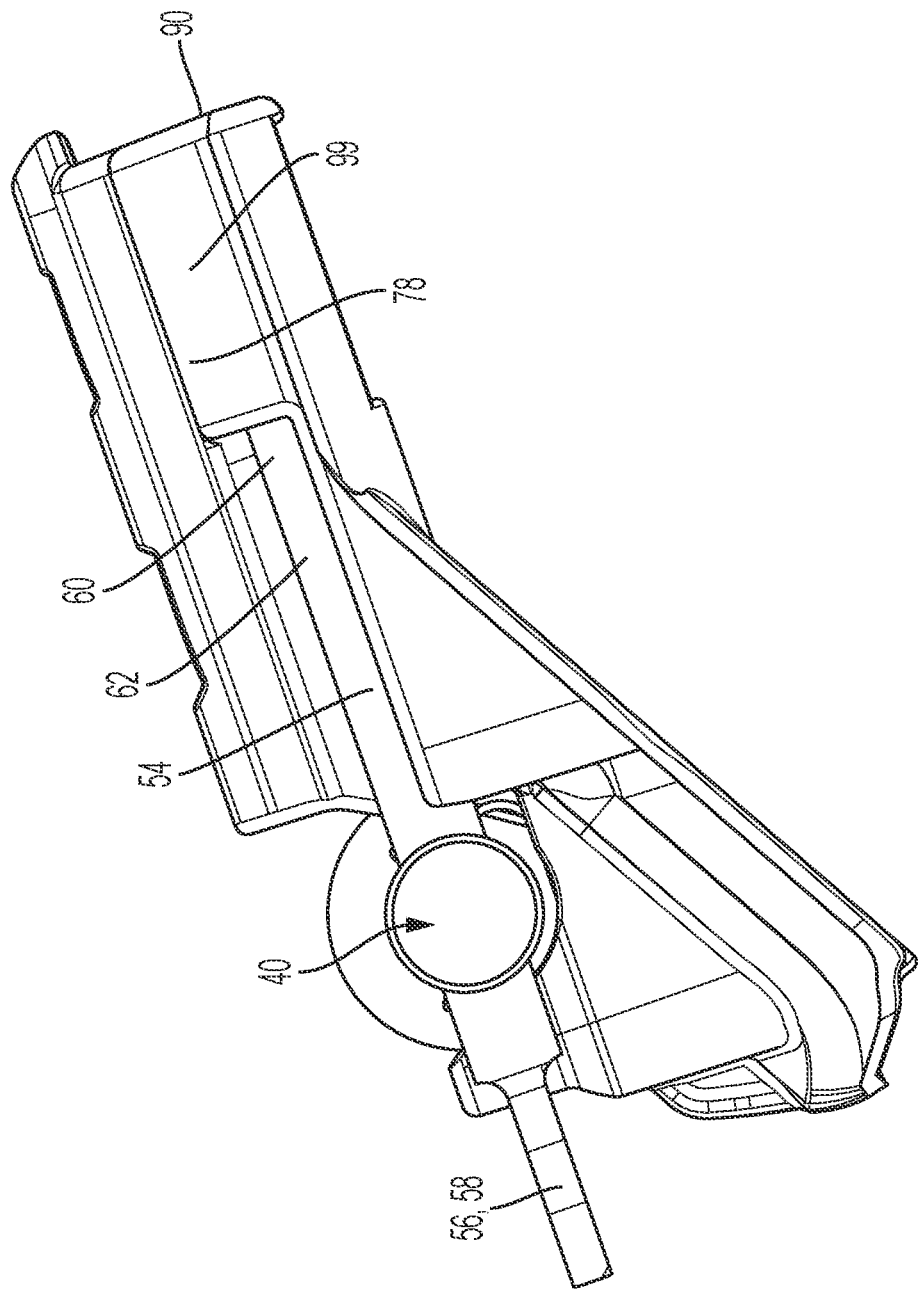

In use, as shown in FIG. 7A, the second shaft 54 of the chuck key 40 is inserted into the second recess 90 along arrow A with the second shaft 60 of the chuck key 40 below the sheath 99. Next, as shown in FIG. 7B, the lever 58 of the chuck key 40 is pressed along arrow B to pivot the chuck key 40 about the first shaft 42, moving the fourth end 60 of the second shaft 56 into the sheath 99. Finally, as shown in FIG.

7C, the first shaft 42 snaps into the spring clip 97. The combination of the spring clip 97 and the sheath 99 enable secure retention of the chuck key in the chuck key holder when not in use to engage the chuck, reducing the likelihood that the chuck key will be misplaced. To remove the chuck key 40, the user lifts the lever 56 to unsnap the first shaft 40 from the spring clip 97 and pivot the second shaft 54 out of the sheath 99, enabling removal of the chuck key 40 from the holder.

Figure 8:
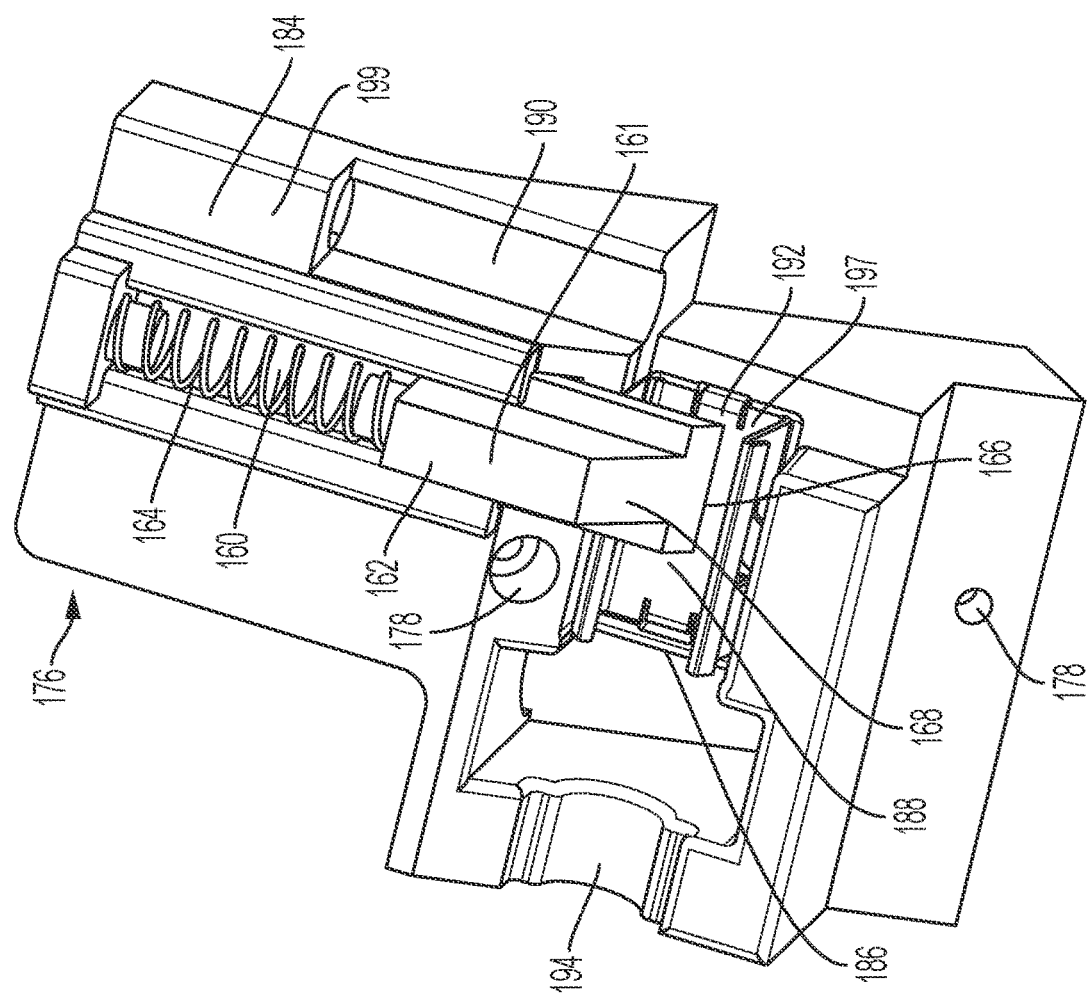
FIG. 8 is a perspective view of another implementation of a chuck key holder.

Referring also to FIG. 8, in another implementation, a chuck key holder 176 is removably coupled to the guard 68 of the handle portion 18 of the housing 12. The chuck key holder 176 has a body 184 having an at least partially U-shaped cross section and configured to wrap at least partially around the guard. The chuck key holder 176 includes at least one opening 178 (e.g., two openings) aligned with the openings 66 in the guard 68. The openings 66, 178 are configured to receive threaded fasteners 82 for removably coupling the chuck key holder 176 to the guard 68 of the housing.

The chuck key holder 176 has a recess 186 configured to releasably retain the chuck key 40 therein. The recess 186 includes a first recess 188 configured to receive the first shaft 42 of the chuck key 40 and a second recess 190 configured to receive the second shaft 54 of the chuck key 40. The first recess 188 is contoured to correspond to a contour of the first shaft 42. For example, the first recess 188 includes a depression 196 configured to receive the key portion 48 and a ledge 194 configured to receive the nose 52. A spring clip 197 is received in the first recess for receiving and retaining the first shaft. The first recess 188 and spring clip 197 alternatively may releasably retain a tool bit, such as a screwdriver bit, when the chuck key is removed from the chuck key holder. The second recess 190 extends into a sheath 199 configured to receive and retain the longer fourth end 60 of the second shaft 54 with its third end 56 extending out of the second recess 190 and out of the sheath 199.

In addition, the chuck key holder 176 includes lock 161 comprising a sliding lock body 162 receivable in a slot 160, and a compression spring 164 disposed in the slot 160 and biasing the sliding lock body 162 outward of the slot. The sliding lock body 162 has a T-shaped cross-section with a base 166 that is slidable over the first recess 188 when the sliding lock body 162 extends from the slot 160 to help retain the chuck key 40 in the first recess 188. The sliding lock body 162 also has a tapered end face 168 that can be engaged by the chuck key 40 when inserting the chuck key 40 into the first recess 188, causing the sliding lock body 162 to retract into the recess 160 against the force of the spring 164. The tapered end face 168 can also be engaged by a user to push the sliding lock body 162 into the slot 160 when removing the chuck key 40 from the holder 176. The chuck key holder may include additional or other types of locks such as an over center latch, a set screw, or a quick release lever.

Figure 9A:
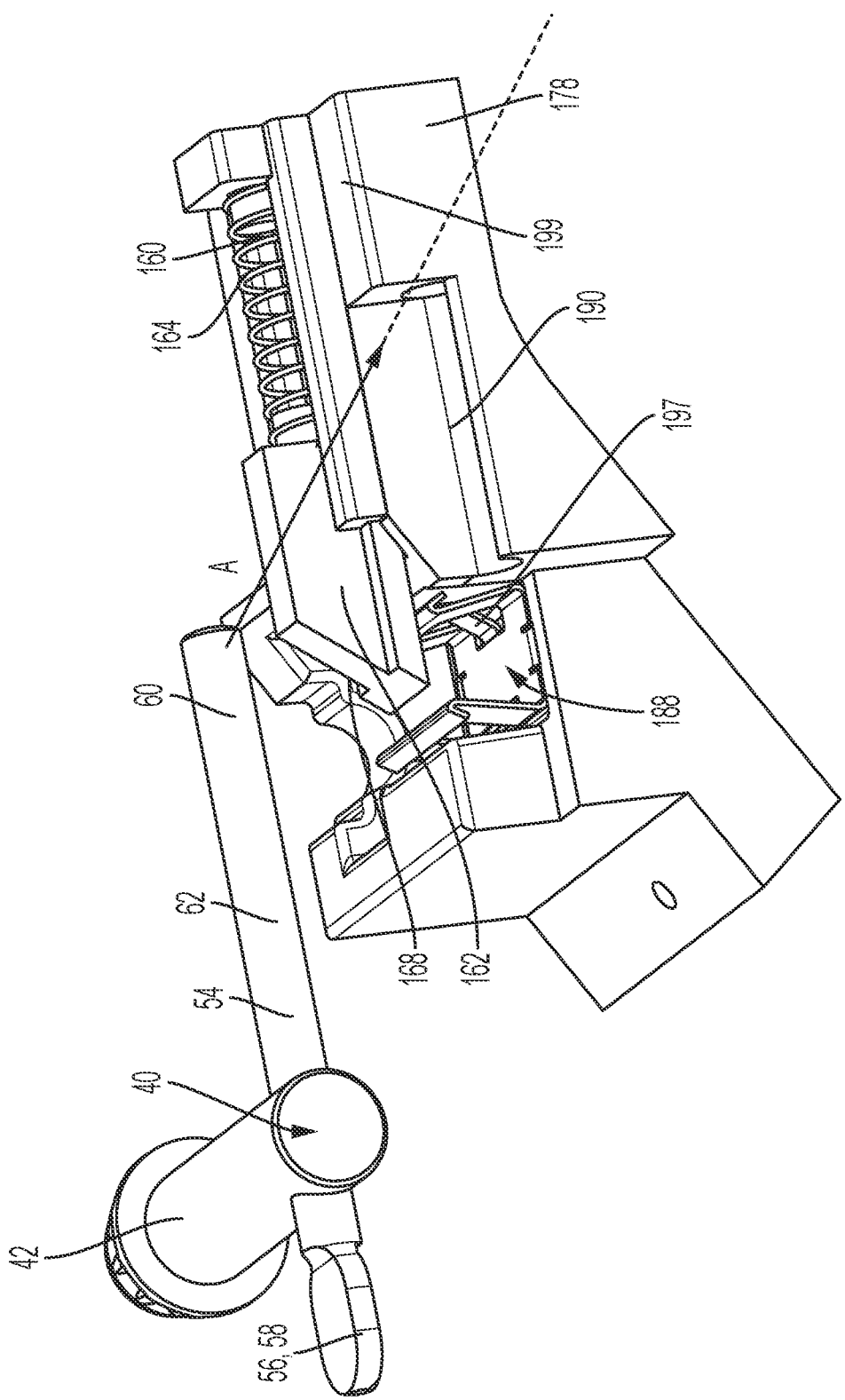
FIGS. 9A-9C are perspective views of the chuck key holder and chuck key of FIG. 8 in operation.
Figure 9B:
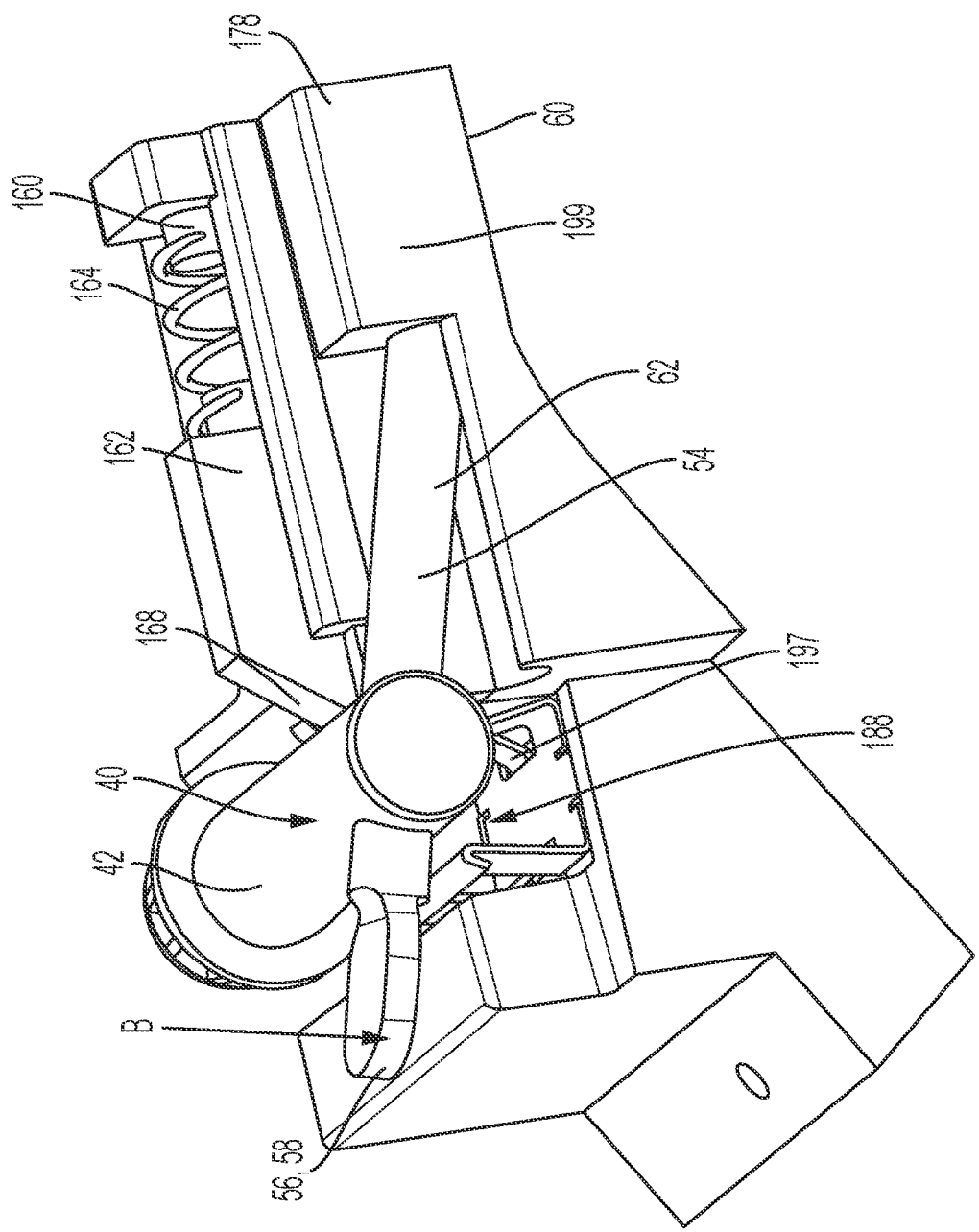
Figure 9C:
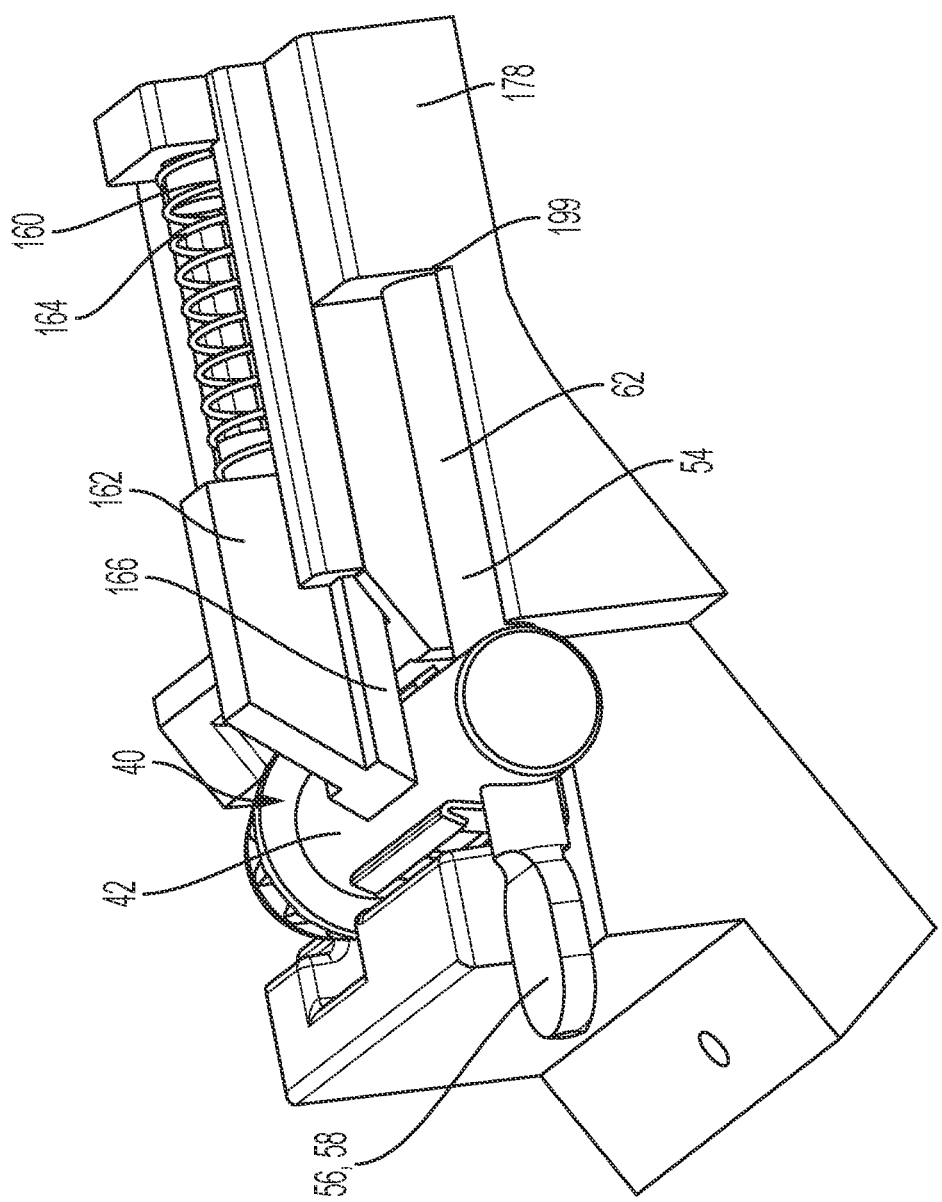

In use, as shown in FIG. 9A, the second shaft 54 of the chuck key 40 is first inserted into the second recess 190 along arrow A with the second shaft 60 of the chuck key 40 below the sheath 199. Next, as shown in FIG. 9B, the lever 58 of the chuck key 40 is pressed along arrow B to press the first shaft 42 of the chuck key 40 against the tapered end face 168 of the sliding lock body 162, pushing the sliding lock body 162 into the slot 160 against the force of the compression spring 164. At the same time, the chuck key 40 pivots about the first shaft 42, moving the fourth end 60 of the second shaft 56 into engagement with the sheath 199 of the into a retained position. Finally, as shown in FIG. 9C, the first shaft 42 snaps into the spring clip 197 and the sliding lock body 162 is released so that the base surface 166 retains the chuck key 40 in the chuck key holder 176. This enables secure retention of the chuck key in the chuck key holder when not in use to engage the chuck, reducing the likelihood that the chuck key will be misplaced. To remove the chuck key 40, the user presses the tapered surface 168 of the sliding lock body 162 against the force of the spring 164, and lifts the lever 56 to unsnap the first shaft 40 from the spring clip 197 and pivot the second shaft 54 out of the sheath 199, enabling removal of the chuck key 40 from the holder.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

Numerous modifications may be made to the exemplary implementations described above. These and other implementations are within the scope of this application.

What is claimed is:

1. A power tool comprising:
a housing;
a motor disposed in the housing;
an output spindle extending outward from the housing and configured to be rotationally driven by the motor;
a keyed chuck coupled to the output spindle for rotation with the output spindle;
a chuck key holder configured to releasably retain a chuck key having a first shaft with a key disposed thereon for operating the chuck, and a second shaft coupled to first shaft generally perpendicular to the first shaft, the second shaft including a lever portion;
wherein the chuck key holder includes a first recess configured to receive the first shaft and a second recess with an enclosed sheath configured to receive the second shaft with the lever portion exposed from the sheath, the chuck key holder including a slidable lock configured to slide over the chuck key to retain the chuck key in the chuck key holder.

2. The power tool of claim 1, wherein the chuck key holder is removably coupled to the housing.

3. The power tool of claim 2, wherein the housing includes a handle portion and the chuck key holder is removably coupled to the handle portion.

4. The power tool of claim 3, wherein the handle portion includes a handgrip configured to be grasped by a hand of a user and a guard disposed in front of the handgrip with a space between the handgrip and the guard with the chuck key holder removably coupled to the guard.

5. The power tool of claim 3, wherein the chuck key holder includes a body having an at least partially U-shaped cross section and configured to wrap at least partially around the handle portion.

6. The power tool of claim 3, further comprising a battery receptacle coupled to a base of the handle portion opposite the motor housing for powering the motor.

7. The power tool of claim 1, wherein the sheath is configured to enable angular rotation of the chuck key about the first shaft between a release position where the chuck key can be removed from the holder and a retained position where the chuck key is retained in the holder, such that the second shaft can be removed by grasping the lever portion and pivoting the chuck key about the first shaft.

8. The power tool of claim 1, wherein the chuck key holder further comprises a spring clip received in the first recess for retaining the first shaft in the first recess.

9. The power tool of claim 8, wherein the first recess is configured to releasably retain a tool bit when the chuck key is removed from the chuck key holder.

10. The power tool of claim 1, wherein the lock is slidable over the first shaft when the first shaft is received in the first recess.

11. A power tool comprising:
a housing;
a motor disposed in the housing;
an output spindle extending outward from the housing and configured to be rotationally driven by the motor;
a keyed chuck coupled to the output spindle for rotation with the output spindle;
a chuck key holder configured to releasably retain a T-shaped chuck key with a key disposed thereon for operating the chuck, the chuck key holder including a body, a recess configured to receive the chuck key, the recess including a first recess portion configured to receive a first shaft of the chuck key with the key disposed thereon and a second recess portion configured to receive a second shaft of the chuck key coupled to the first shaft of the chuck key generally perpendicular to the first shaft, and a slidable lock that is slidably received in a slot in the chuck key holder and configured to slide at least partially out of the slot and at least partially over the chuck key when the chuck key is received in the recess to retain the chuck key in the recess, the slidable lock including a sliding lock body biased outward from the slot and configured to slide over the first shaft when the first shaft is received in the first recess, and
wherein the body includes a sheath configured to receive a one end portion of the second shaft of the chuck key with a lever portion of the chuck key exposed from the sheath.

12. The power tool of claim 11, wherein the chuck key holder is removably coupled to the housing.

13. The power tool of claim 12, wherein the housing includes a handle portion and the chuck key holder is removably coupled to the handle portion.

14. The power tool of claim 13, wherein the body includes a portion having an at least partially U-shaped cross section and configured to wrap at least partially around the handle portion.

15. The power tool of claim 11, wherein the sheath is configured to enable angular rotation of the chuck key about the first shaft between a release position where the chuck key can be removed from the holder and a retained position where the chuck key is retained in the holder, such that the second shaft can be removed by grasping the lever portion and pivoting the chuck key about the first shaft.

16. The power tool of claim 11, wherein the sliding lock body is biased outward from the slot by a spring.

17. The power tool of claim 16, wherein the sliding lock body has a tapered end face that is configured to be engaged by the first shaft of the chuck key when inserting the chuck key into the first recess, causing the sliding lock body to retract into the slot against the force of the spring.

* * * * *